United States Patent
Kaji et al.

(10) Patent No.: US 9,570,726 B2
(45) Date of Patent: Feb. 14, 2017

(54) BASE FOR LITHIUM ION SECONDARY BATTERY SEPARATORS, METHOD FOR PRODUCING BASE FOR LITHIUM ION SECONDARY BATTERY SEPARATORS, AND LITHIUM ION SECONDARY BATTERY SEPARATOR

(71) Applicant: MITSUBISHI PAPER MILLS LIMITED, Tokyo (JP)

(72) Inventors: Hiroo Kaji, Tokyo (JP); Toshihiro Shigematsu, Tokyo (JP); Nobuaki Hirota, Tokyo (JP); Hiroshi Matsuda, Tokyo (JP)

(73) Assignee: MITSUBISHI PAPER MILLS LIMITED, Tokyo (JP)

( * ) Notice: Subject to any disclaimer, the term of this patent is extended or adjusted under 35 U.S.C. 154(b) by 352 days.

(21) Appl. No.: 14/376,531

(22) PCT Filed: Jan. 25, 2013

(86) PCT No.: PCT/JP2013/052297
§ 371 (c)(1),
(2) Date: Aug. 4, 2014

(87) PCT Pub. No.: WO2013/118639
PCT Pub. Date: Aug. 15, 2013

(65) Prior Publication Data
US 2015/0024250 A1    Jan. 22, 2015

(30) Foreign Application Priority Data

Feb. 9, 2012   (JP) ................................. 2012-026364
Dec. 26, 2012  (JP) ................................. 2012-282289

(51) Int. Cl.
| | |
|---|---|
| *H01M 2/16* | (2006.01) |
| *D21H 25/04* | (2006.01) |
| *D21H 13/24* | (2006.01) |
| *H01M 2/14* | (2006.01) |
| *H01M 10/0525* | (2010.01) |

(52) U.S. Cl.
CPC ............ *H01M 2/162* (2013.01); *D21H 13/24* (2013.01); *D21H 25/04* (2013.01); *H01M 2/145* (2013.01); *H01M 2/1646* (2013.01); *H01M 2/1666* (2013.01); *H01M 10/0525* (2013.01)

(58) Field of Classification Search
None
See application file for complete search history.

(56) References Cited

U.S. PATENT DOCUMENTS

| | | |
|---|---|---|
| 4,165,352 A | 8/1979 | Volkman |
| 2001/0029138 A1 | 10/2001 | Aikawa et al. |
| 2003/0017386 A1 | 1/2003 | Daido et al. |
| 2006/0024569 A1 | 2/2006 | Hennige et al. |
| 2007/0264577 A1 | 11/2007 | Katayama et al. |

FOREIGN PATENT DOCUMENTS

| | | |
|---|---|---|
| JP | 10-325059 | 12/1998 |
| JP | 2000-336568 | 12/2000 |
| JP | 2003-123728 | 4/2003 |
| JP | 2005-293891 | 10/2005 |
| JP | 2005-536857 | 12/2005 |
| JP | 2006-19191 | 1/2006 |
| JP | 2007-157723 | 6/2007 |
| JP | 2007-317675 | 12/2007 |
| JP | 2009-230975 | 10/2009 |
| JP | 2011-82148 | 4/2011 |
| JP | 2011-89226 | 5/2011 |
| JP | 2011-154937 | 8/2011 |
| JP | 2011-187346 | 9/2011 |
| JP | 2012-003873 | 1/2012 |
| WO | 2011/046066 | 4/2011 |
| WO | 2012/008559 | 1/2012 |

OTHER PUBLICATIONS

Machine translation of WO 2012008559, Jan. 2012.*
Extended European Search Report issued Jun. 11, 2015 in corresponding European Application No. 13746236.2.
International Search Report issued May 7, 2013 in International (PCT) Application No. PCT/JP2013/052297.
Written Opinion of the International Searching Authority issued May 7, 2013 in International (PCT) Application No. PCT/JP2013/052297.

* cited by examiner

*Primary Examiner* — Jonathan Crepeau
(74) *Attorney, Agent, or Firm* — Wenderoth, Lind & Ponack, L.L.P.

(57) ABSTRACT

A base material for a lithium ion secondary battery separator provided by the present invention comprises a polyethylene terephthalate fiber, in which an average fiber diameter of the polyethylene terephthalate fiber is 9.0 μm or less, a specific X-ray diffraction intensity derived from the polyethylene terephthalate fiber is 300 cps/(g/m$^2$) or more, and a coefficient of variation of a specific X-ray diffraction intensity is 12.0% or less, and is excellent in the workability during production and excellent in mechanical strength, uniformity and handling in a subsequent treatment step.

6 Claims, No Drawings

BASE FOR LITHIUM ION SECONDARY BATTERY SEPARATORS, METHOD FOR PRODUCING BASE FOR LITHIUM ION SECONDARY BATTERY SEPARATORS, AND LITHIUM ION SECONDARY BATTERY SEPARATOR

TECHNICAL FIELD

The present invention relates to a base material for a lithium ion secondary battery separator, which can suitably be used in a lithium ion secondary battery such as a lithium ion secondary battery and a lithium ion polymer secondary battery, a process for producing the base material for a lithium ion secondary battery separator, and a lithium ion secondary battery separator.

BACKGROUND ART

In recent years, with the spread of mobile electronic devices and high performance requirement thereof, a secondary battery having a high energy density has been desired. As this kind of battery, a lithium ion secondary battery that uses an organic electrolyte (non-aqueous electrolyte) has been under attention. Since this lithium ion secondary battery can generate an average voltage of about 3.7 V, which is about 3 times a voltage of an alkali secondary battery that is a conventional secondary battery, it can achieve a high energy density. However, unlike the alkali secondary battery, the lithium ion secondary battery can not use an aqueous electrolyte, and therefore a non-aqueous electrolyte having sufficient oxidation-reduction resistance is used. Since the non-aqueous electrolyte is inflammable and has danger of ignition or the like, a full attention is paid to safety in the use thereof. Several cases that are exposed to a danger of ignition or the like can be considered, and particularly overcharge is dangerous.

In order to prevent the overcharge, in a conventional non-aqueous secondary battery, a constant voltage and constant current charge is performed, and a precise IC (protection circuit) is provided to the battery. The cost of the protection circuit is large, which makes the cost of the non-aqueous secondary battery high.

In case of preventing the overcharge by the protection circuit, the protection circuit is naturally assumed not to work well in some times, and it is difficult to say essentially safe. In a conventional non-aqueous secondary battery, for the purpose of safely destroying the overcharged battery due to breakdown of the protection circuit during the overcharge, attempts have been made to develop equipment of a safety valve•PTC element, a lithium ion secondary battery separator having a thermal fuse function and the like. However, even when such equipment and function as described above are adopted, the safety of the battery during the overcharge is not surely guaranteed depending on the condition of the overcharge. Actually the fire accident of the non-aqueous secondary battery occurs at the present time.

As a lithium ion secondary battery separator, film-like porous films made of polyolefin such as polyethylene are often used. The porous film has a thermal fuse function (shut-down function) such that when an inside temperature of the battery becomes about 130° C., the porous film is melted and fills micro-pores, thereby preventing a lithium ion from migrating, and shutting off the current. However, when the temperature further rises for any reasons, there is suggested a possibility that the polyolefin itself is melted and short-circuited, and thermal runaway is caused. For this reason, at the present time, a heat-resistant separator that is neither melted nor shrunk even under a temperature of about 200° C. has been developed.

As the heat-resistant separator, there are a non-woven fabric made of a polyester fiber and a non-woven fabric in which an aramid fiber that is a heat-resistant fiber is blended with the polyester fiber. However, since these fabrics have large pore diameters and cause an internal short circuit, they are not practical (see Patent Documents 1 to 3, for example). On the other hand, there have been reported examples in which a lithium ion secondary battery separator is formed by applying various composition treatments on a base material such as a non-woven fabric and a woven fabric for a lithium ion secondary battery separator. For example, there have been reported an example in which a composite is formed by laminating a film-like porous polyolefin film on a base material for a lithium ion secondary battery separator, which is composed of a non-woven fabric made of a polyester fiber, and an example in which heat resistance is imparted to the battery by performing a composition treatment such as incorporation of filler particles, surface coating of a resin or the like to a base material such as a non-woven fabric and a woven fabric for a lithium ion secondary battery separator (see Patent Documents 4 to 6, for example). However, since the non-woven fabric that is used as the base material for a lithium ion secondary battery separator has large pore sizes and low surface smoothness, there were quality problems such that surface irregularity is large when fabricated by surface coating, and fabricating materials such as filler particles and the resin are likely to fall off.

In order to improve the denseness of the base material for a lithium ion secondary battery separator, there has been proposed base materials in which an average fiber diameter of a synthetic short fiber that forms the base material for a lithium ion secondary battery separator is made small and a fiber having a specified fiber diameter and fiber length is contained (see, Patent Documents 7 and 8, for example). Patent Documents 7 and 8 disclose a process for producing a base material for a lithium ion secondary battery separator by a wet method and they mention the dispersibility of the fiber. However in these Patent Documents, neither other producing processes are detailed nor studies are not made on a relationship with quality and handling of the base material for a lithium ion secondary battery separator and the lithium ion secondary battery separator. Further, there have been reported examples in which as a fiber that forms a base material for a lithium ion secondary battery separator, a fibrillated fiber is blended to further improve the denseness of the base material (see Patent Documents 9 to 11, for example). However, also in Patent Documents 9 to 11, detailed studies have not been made on the process for producing the base material for a lithium ion secondary battery separator, and a relationship with quality and handling of the base material for a lithium ion secondary battery separator.

PRIOR ART DOCUMENTS

Patent Documents

[Patent Document 1] Japanese Patent Application Publication No. 2003-123728 (JP 2003-123728 A)
[Patent Document 2] Japanese Patent Application Publication No. 2007-317675 (JP 2007-317675 A)
[Patent Document 3] Japanese Patent Application Publication No. 2006-19191 (JP 2006-19191 A)

[Patent Document 4] Japanese Patent Application Publication No. 2005-293891 (JP 2005-293891 A)
[Patent Document 5] Published Japanese Translation of PCT Application No. 2005-536857 (JP 2005-536857 A)
[Patent Document 6] Japanese Patent Application Publication No. 2007-157723 (JP 2007-157723 A)
[Patent Document 7] Japanese Patent Application Publication No. 2009-230975 (JP 2009-230975 A)
[Patent Document 8] Japanese Patent Application Publication No. 2011-82148 (JP 2011-82148 A)
[Patent Document 9] Japanese Patent Application Publication No. 2012-3873 (JP 2012-3873 A)
[Patent Document 10] Japanese Patent Application Publication No. 2011-187346 (JP 2011-187346 A)
[Patent Document 11] WO 2011/46066 A

SUMMARY OF THE INVENTION

Problems to be Solved by the Invention

The problems to be solved by the present invention are to provide a base material for a lithium ion secondary battery separator that is excellent in workability during production and excellent in strength, uniformity and handling in a subsequent treatment step; a process for producing the base material for a lithium ion secondary battery separator; and a lithium ion secondary battery separator that is formed with the base material for a lithium ion secondary battery separator.

Means for Solving the Problem

The present invention that solves the problems described above relates to (1) a base material for a lithium ion secondary battery separator comprising a polyethylene terephthalate fiber, characterized in that an average fiber diameter of the polyethylene terephthalate fiber is 9.0 μm or less, a specific X-ray diffraction intensity derived from the polyethylene terephthalate fiber is 300 cps/(g/m$^2$) or more, and a coefficient of variation of the specific X-ray diffraction intensity is 12.0% or less, (2) the base material for a lithium ion secondary battery separator as recited in (1), wherein an average fiber diameter of polyethylene terephthalate fiber is 4.0 to 8.0 μm, (3) a process for producing a base material for a lithium ion secondary battery separator, characterized in that a base paper comprising a polyethylene terephthalate fiber is subjected to a heat calendering treatment with a heat calender machine constituted of a resin roll and a heated metal roll, (4) the process for producing a base material for a lithium ion secondary battery separator as recited in (3), wherein the base paper is subjected to a heat calendering treatment of two stages (2 nips) or more in such a manner that the both front and back surfaces of the base paper come in contact with a heated metal roll, (5) A base material for a lithium ion secondary battery separator produced by the process of (3) or (4) for producing a base material for a lithium ion secondary battery separator, and (6) a lithium ion secondary battery separator, characterized in that a coating layer containing inorganic particles has been applied onto the base material for a lithium ion secondary battery separator as recited in any one of (1), (2) or (5).

Effects of the Invention

The base materials (1), (2) and (5) of the present invention for a lithium ion secondary battery separator become the lithium ion secondary battery separator (6) when a coating layer containing inorganic particles is applied thereon. The base material (1) of the present invention for a lithium ion secondary battery separator comprises a polyethylene terephthalate fiber in which an average fiber diameter of the polyethylene terephthalate fiber is 9.0 μm or less, a specific X-ray diffraction intensity derived from the polyethylene terephthalate fiber is 300 cps/(g/m$^2$) or more, and a coefficient of variation of the specific X-ray diffraction intensity is 12.0% or less. The base material (1) of the present invention for a lithium ion secondary battery separator is more excellent in workability when the coating layer containing inorganic particles is applied, and more excellent in strength, uniformity and handling in the subsequent treatment step than a conventional base material for a lithium ion secondary battery separator.

Further, the base material (2) of the present invention for a lithium ion secondary battery separator, in which an average fiber diameter of a polyethylene terephthalate fiber is 4.0 to 8.0 μm, is more excellent in workability when the coating layer containing inorganic particles is applied on the base material for a lithium ion secondary battery separator and is more excellent in strength, uniformity and handling in the subsequent treatment step.

According to the processes (3) and (4) of the present invention for producing a base material for a lithium ion secondary battery separator, the base paper comprising a polyethylene terephthalate fiber is subjected to a heat calendering treatment with a heat calender machine constituted of a resin roll and a heated metal roll, whereby a base material for a lithium ion secondary battery separator is produced. Further, when the heat calendering treatment is performed in two stages (two nips) or more such that both of the front and back surfaces of the base paper come into contact with the heated metal rolls, workability becomes more excellent during application of the coating layer containing inorganic particles on the base material for a lithium ion secondary battery separator, and strength, uniformity and handling in subsequent treatment step become more excellent. According to the process (3) or (4) of the present invention for producing a base material for a lithium ion secondary battery separator, the base material (1) or (2) of the present invention for a lithium ion secondary battery separator can be more efficiently produced.

MODES FOR CARRYING OUT THE INVENTION

Hereinafter, there will be described in more detail a base material of the present invention for a lithium ion secondary battery separator (hereinafter, abbreviated as "base material" in several cases); a process for producing the base material for a lithium ion secondary battery separator; and a lithium ion secondary battery separator (hereinafter, abbreviated as "separator" in several cases).

The base material of the present invention comprises a polyethylene terephthalate (PET) fiber, characterized in that an average fiber diameter of the PET fibers of all the base material is 9.0 μm or less, a specific X-ray diffraction intensity derived from the PET fiber is 300 cps/(g/m$^2$) or more and a coefficient of variation of the specific X-ray diffraction intensity is 12.0% or less.

The average fiber diameter of the fiber in the present invention was measured according to the following procedure.

1) A microphotograph of a surface of the base material is taken at a magnification of 1000 times.

2) In the microphotograph described above, a line is drawn in a normal direction (cross direction, CD) to a flow direction (machine direction, MD) of the base material, and fiber diameters are measured with PET fibers that intersect with the drawn line as a target.

3) Regarding the fibers that are selected as the measurement target, when a fiber intersects with the line orthogonally or obliquely, a fiber width in a direction orthogonal to a fiber axis is measured as a fiber diameter.

4) For a plurality of microphotographs, fiber diameters of at least 50 or more of fibers were measured according to the measurements of 1) to 3), and they were arithmetically averaged.

In the present invention, an average fiber diameter of the PET fibers seen from each of both surfaces of the base material is measured, and an average value of the average fiber diameters of the PET fibers seen from the both surfaces is taken as an "average fiber diameter".

When a coated layer containing inorganic particles is formed on the base material of the present invention, it is necessary for a coating liquid containing inorganic particles to moderately penetrate in the base material. The coating liquid penetrates in the base material, whereby a binding force at an interface between the coated layer and the base material becomes strong, and the strength of the coated layer is increased. Further, the coating liquid moderately penetrates into pores of the base material, whereby the strength of the base material is improved. However, when an average fiber diameter of the PET fiber used in the base material for a lithium ion secondary battery separator exceeds 9.0 µm, the density of fibers intersecting with each other in a nonwoven fabric becomes low and the strength of the base material becomes difficult to be developed. Further, the coating liquid is liable to penetrate in a thickness direction of the nonwoven fabric, and the coating liquid penetrates through to a surface opposite to the surface on which the coating liquid was applied. As a result, when the coating liquid is applied, a coating machine is smeared, operability is degraded and the penetrated coating liquid damages the uniformity of the base material for a lithium ion secondary battery separator. In the base material of the present invention, an average fiber diameter of the PET fiber is 9.0 µm or less, more preferably in the range of 4.0 to 8.0 µm, and still more preferably in the range of 4.0 to 7.0 µm.

In the present invention, a value obtained by dividing an average of measured values of an X-ray diffraction intensity by a basis weight of a base material is defined as a "specific X-ray diffraction strength". An X-ray diffraction intensity derived from a crystalline part of the PET fiber in the base material can be obtained by the measurement with an X-ray diffractometer. An X-ray diffraction intensity derived from a crystalline part of the PET fiber can be obtained as diffraction peaks at diffraction angles $2\theta=18°$, $23°$ and $26°$. The specific X-ray diffraction intensity of the base material of the present invention is a value obtained by dividing an X-ray diffraction intensity at the diffraction angle $2\theta=26°$ by a basis weight of a base material. In the base material of the present invention, the X-ray diffraction intensity derived from the PET fiber or the degree of crystallization varies depending on thermal history received in the producing step. When the X-ray diffraction intensity becomes larger, and the crystallization of the PET fibers proceeds, the strength of the base material is improved. In the present invention, the specific X-ray diffraction intensity is 300 $cps/(g/m^2)$ or more, more preferably 340 $cps/(g/m^2)$ or more and still more preferably 380 $cps/(g/m^2)$ or more.

When the specific X-ray diffraction intensity for the base material of the present invention is measured, the X-ray diffraction intensities are measured at measurement points (areas) of 5 or more of the base material and an average value of the X-ray diffraction intensities are calculated. At the same time, the coefficient of variation of the measured values (=standard deviation/average value×100) is obtained. The measurement points are sampled such that measurement points are adjacent with each other, and measurement is performed such that a total measurement area becomes 1500 $mm^2$ or more. Larger coefficient of variation means that the deviation of crystallinity of the PET fiber in a surface direction of the base material is large. It has been found that, in the present invention, by restricting the coefficient of variation of the specific X-ray diffraction intensity of the base material to 12.0% or less, there can be obtained the base material which is less in bumpiness and undulation in actual use and excellent in processability. In the present invention, the coefficient of variation is 12.0% or less, more preferably 9.0% or less, still more preferably 3.0% or less.

As producing steps in which the base material undergoes thermal history, there are exemplified a drying step used when the base paper is produced by a wet web making method, a step of thermally fusing fibers used when the base paper is produced by a dry paper making method, a heat calendering treatment of the base paper and the like. Among these, the heat calendering treatment of the base paper is most effective in order to obtain the base material that has the specific X-ray diffraction intensity derived from the PET fibers of 300 $cps/(g/m^2)$ or more and excellent strength.

As a material of a roll used when the heat calendering treatment is performed, a metal roll is used as a heat roll. As a roll that is used in combination with the heat roll, a metal roll and an elastic roll (resin roll) can be used. A heat calender machine constituted of a combination of a metal roll and a metal roll, when seen from the viewpoint of the machine, can press heated metal rolls against both of front and back surfaces of the base material and can be operated under relatively wide treatment temperature range and treatment linear pressure range. However, when the treatment is actually conducted with the heat calender machine constituted of a combination of a metal roll and a metal roll, heat and load are applied to the base material in a narrow nip width, and as the results, distortion tends to be generated, and defects such as wrinkles and cracks are generated in several cases.

In a heat calender machine constituted of a combination of a metal roll and an elastic roll, heat and load are applied to the base material in a wide nip width, and as the result, the distortion is less generated in the base material, and defects such as wrinkle and crack are not generated. When the heat calendering treatment is conducted with the heat calender machine constituted of a combination of a metal roll and an elastic roll, there can be efficiently provided the base material that has the specific X-ray diffraction intensity derived from the PET fiber of 300 $cps/(g/m^2)$ or more and its coefficient of variation of 12.0% or less, and is excellent in strength and uniformity.

Regarding the hardness of the elastic roll, a roll having the Shore D hardness of 85 to 94 can be selected. The roll having the Shore D hardness of 90 or more is more desirably used in view of the durability of the roll and the strength and uniformity of the base material.

In the present invention, the specific X-ray diffraction intensity of the base material and the coefficient of variation of the specific X-ray diffraction intensity can be adjusted by a linear pressure, a treatment temperature (temperature of the heated metal roll) and a processing speed during the heat calendering treatment. The treatment temperature is preferably 170 to 200° C., more preferably 180 to 200° C. and still more preferably 185 to 200° C. When the treatment temperature during the heat calendering treatment is low, the crystallization of the PET fiber does not proceed, and the sufficient strength of the PET fiber is not developed in several cases. When the treatment temperature during the heat calendering treatment is too high, the specific X-ray diffraction intensity decreases, and the coefficient of variation of the specific X-ray diffraction intensity becomes larger in several cases. Further, there is a risk that the base material is excessively melted on a heat roll surface during the heat calendering treatment, whereby defects are induced in some cases.

Also by the linear pressure during the heat calendering treatment, the specific X-ray diffraction intensity of the base material and the coefficient of variation of the specific X-ray diffraction intensity can be adjusted. The linear pressure during the heat calendering treatment varies depending on the basis weight of the base material, the processing speed, and the material of the calender roll, but it is preferably 100 to 190 kN/m, more preferably 125 to 190 kN/m and still more preferably 150 to 175 kN/m. When the linear pressure during the heat calendering treatment is too low, the crystallization of the PET fiber does not proceed, and the sufficient strength of the PET fiber is not developed thereby in several cases. When the linear pressure during the heat calendering treatment is too high, excessively collapsed fine spots are generated, whereby crack defects tend to occur around collapsed fine spots. Further, the uniformity in the sheet is damaged in several cases.

Also by the processing speed in the heat calendering treatment, the specific X-ray diffraction intensity of the base material and the coefficient of variation of the specific X-ray diffraction intensity can be adjusted. When the processing speed during the heat calendering treatment becomes larger, an amount of heat per unit time which is imparted to the base material from the heat calender machine is decreased, whereby the crystallization of the PET fiber in the base material becomes difficult to proceed in several cases. When the processing speed during the heat calendering treatment is made larger, the crystallization of the PET fiber can be accelerated by raising the treatment temperature, by raising the calender linear pressure, or by performing the multi-staged heat calendering treatment.

When, in the present invention, the heat calendering treatment is performed in two stages (two nips) or more such that both of the front and back surfaces of the base material come into contact with the heated metal rolls, there can be provided more efficiently the base material for a lithium ion secondary battery separator that has the specific X-ray diffraction intensity derived from the PET fiber of 300 cps/(g/m$^2$) or more and the coefficient of variation of 12.0% or less, and is excellent in strength and uniformity.

When the heat calendering treatment is performed such that both of the front and back surfaces of the base material come into contact with the heated metal rolls, the crystallization of the polyethylene terephthalate fiber can uniformly proceed in a thickness direction of the base material. As the result, it becomes possible to more efficiently provide the base material excellent in strength and uniformity. As a method of performing the heat calendering treatment such that the heated metal rolls comes into contact with both of the front and back surfaces of the base material are exemplified a method of heat calendering in one stage (one nip) or more with a heat calender machine constituted of a heated metal roll and a heated metal roll, and a method of heat calendering in two stages (two nips) or more such that both of the front and back surfaces of the base material come into contact with the heated metal roll in a calender machine which consists of one of the heated metal roll and an elastic roll or other roll. Among these, the method of heat calendering in two stages (two nips) or more such that both of the front and back surfaces of the base material come into contact with the heated metal rolls is preferred in order to more efficiently provide the base material that is excellent in strength and uniformity. As required, the heat calendering treatment may be performed in multi-stages of three (three nips) or more.

The base material of the present invention comprises the PET fiber as a constituent fiber. The PET fiber contained in the base material of the present invention is a fiber that contains a component showing diffraction peaks derived from a crystal structure at least at diffraction angles of 2θ=18°, 23° and 26° when an X-ray diffraction measurement is performed. Therefore, a fiber that is constituted of PET alone and also a composite fiber made of the PET and other resin(s) can be used. Further, the PET fiber can contain a main fiber that plays a role of forming a skeleton of the base material and a binder fiber that plays a role of binding fibers with each other and developing the strength of the whole base material.

A fiber length of the main fiber is not particularly limited, but it is preferably 1 to 12 mm, more preferably 3 to 10 mm, and still more preferably 4 to 6 mm. When the fiber length is less than 1 mm, it is difficult to forma three-dimensional network of fibers in the step of making paper, and there is a fear of making the peeling of a wet web from a forming wire worse. On the other hand, when the fiber length exceeds 12 mm, there is a fear that the entanglement or twisting of fibers with each other is generated, and the uniformity of the base material may be adversely affected. Although a cross-sectional form of the main fiber is preferably a circle, a fiber having a different cross-section such as a T type, a Y type, a triangle and the like may be contained.

As the binder fiber are exemplified a composite fiber such as a core shell fiber (core shell type), a parallel fiber (side-by-side type), a radially dividable fiber, an un-drawn fiber and the like. Since the composite fiber is not apt to form a film, mechanical strength can be improved while maintaining a space of the base material. More specifically, a composite fiber of a high melting point polyester (core) and a low melting point polyester (shell) and the un-drawn fiber such as polyester can be exemplified. In the present invention, the composite fiber of a high melting point polyester (core) and a low melting point polyester (shell), and the un-drawn fiber of polyester can be preferably used.

Although a fiber diameter of the binder fiber is preferably different from that of the main fiber, it is not particularly limited. When the fiber diameter of the binder fiber is different from that of the main fiber, the binder fiber plays not only a role of improving the mechanical strength of the base material, but also a role of forming a uniform three-dimensional network together with the main fiber and a fine diameter fiber. Further, the binder fiber can improve the smoothness of the base material in the step of raising a temperature to more than a softening temperature or a melting temperature of the binder fiber in drying with a Yankee dryer or hot air drying.

The fiber length of the binder fiber is not particularly limited. However, when the fiber length exceeds 20 mm, the formation of the base materials tends to be degraded. The binder fiber can contain a fiber having a cross-section of a circle or a fiber having a different cross-section such as a T type, a Y type, a triangle and the like.

In the present invention, a content ratio of the main fiber and the binder fiber is, by mass, preferably 90:10 to 10:90, more preferably 85:15 to 15:85, and still more preferably 70:30 to 30:70. When the content of the main fiber falls below 10% by mass, the microporosity of the base material may be degraded. When the content of the main fiber exceeds 90% by mass, the mechanical strength of the base material may be degraded and the base material tends to be broken in several cases.

In the base material of the present invention, fibers other than the PET fiber can be blended in the range that does not affect the quality and productivity of the base material. For example, fibers such as polyolefin, polyamide, polyacryl, vinylon, vinylidene, polyvinyl chloride, polyester other than the PET, benzoate, polychlal, phenol fibers and the like can be exemplified. Further, semi-synthetic fibers such as acetate, triacetate and promix and regenerated fibers such as rayon, cupra, lyocell fibers may be contained in the range that does not affect the performance of the base material.

A content ratio of the PET fiber and fibers other than the PET fiber is, by mass, preferably 100:0 to 70:30, more preferably 100:0 to 80:20, and still more preferably 100:0 to 90:10.

As a method of making a base paper associated with the base material of the present invention, there are dry methods such as a carding method, an air laying method and the like, wet methods such as a paper making method and the like, a spunbonding method, a melt blowing method and the like. The base paper obtained by the wet method can preferably provide the base material which is more uniform and dense than those obtained by other producing methods.

In the wet method, firstly, the main fiber and the binder fiber are uniformly dispersed in water, and after, passing through a screening step (removal of foreign matters, blocks and the like) and the like, a slurry of which final fiber concentration is adjusted to 0.01 to 0.50% by mass is used in order to make a wet web on a paper machine. In order to make the dispersibility of the fiber uniform, chemicals such as a dispersant, a defoamer, a hydrophilicity imparting agent, an antistatic agent, a polymer thickener, a release agent, an antibacterial agent, a germicidal agent and the like may be added in the course of the process.

As the paper machine, a Fourdrinier paper machine, a cylinder paper machine, an inclined wire machine and the like can be used. These paper wires may be used singly or as a combined paper machine in which the same or different kinds of two or more paper wires are disposed on-line. Further, in case that the base paper produced has a multilayered structure of two or more layers, there may be used any of a paper-making method in which wet webs obtained by the respective paper machines are laminated; another paper-making method in which a multi-layered paper is formed by a paper machine having a plurality of head boxes; and a method in which one sheet is formed, and thereafter a slurry in which fibers are dispersed is cast on the sheet.

The wet webs produced by the paper machine is dried with a Yankee dryer, an air dryer, a cylinder dryer, a suction-drum dryer, an infrared dryer or the like to obtain the base paper. When the wet web is dried, heat-pressure drying of the wet web in a close contact with the paper hot roll of the Yankee dryer or the like improves the smoothness of the paper surface that has been closely contacted with the roll. The heat-pressure drying means drying wet web by pressing it against the hot roll with a touch roll or the like. A surface temperature of the hot roll is preferably 100 to 180° C., more preferably 100 to 160° C., and still more preferably 110 to 160° C. The pressure is preferably 5 to 100 kN/m and more preferably 10 to 80 kN/m.

A basis weight of the base material of the present invention is not particularly limited, but it is preferably 5.0 to 30.0 g/m² and more preferably 10.0 to 20.0 g/m². In case of less than 5.0 g/m², paper tends to be broken during the paper-making step, and sufficient tensile strength cannot be obtained. Further, in case of exceeding 30.0 g/m², it is necessary to impart a large amount of heat to the base paper during heat calendering the base paper, and the productivity of the base material may be decreased.

A density of the base material of the present invention is preferably 0.45 to 0.75 g/cm³ and more preferably 0.50 to 0.65 g/cm³. When the density of the base material is less than 0.45 g/cm³, a binding area between PET fibers is not sufficient, and sufficient strength of the whole base material may not be developed. On the other hand, in case of exceeding 0.75 g/cm³, the PET fibers melt and adhere to each other excessively to partly form a film, and the uniformity of the base material may be degraded.

The lithium ion secondary battery separator of the present invention is formed by disposing a coated layer containing inorganic particles, on the base material of the present invention for a lithium ion secondary battery separator. The coated layer that is disposed on the base material contains the inorganic particles, and occasionally contains a binder resin. As the inorganic particles, there can be used alumina such as α-alumina, β-alumina, γ-alumina; alumina hydrate such as boehmite, pseudo-boehmite; magnesium oxide; calcium oxide; silica and the like. Among these, α-alumina or alumina hydrate is preferably used in the point of high stability to the electrolyte that is used in the lithium ion secondary battery. As the binder resin, there can be used various kinds of synthetic resins such as a styrene-butadiene resin, an acrylic acid ester resin, a methacrylic acid ester resin, fluorine resins represented by polyvinylidene fluoride, and the like.

In the present invention, the coating liquid used to form a coated layer may contain, together with above mentioned inorganic particles and binder resins, various additives including dispersants such as polyacrylic acid, carboxymethylcellulose sodium, thickeners such as hydroxyethyl cellulose, carboxymethylcellulose sodium, polyethylene oxide, wetting agents, antiseptics, defoamers and the like. Among these additives, the chemicals such as the thickeners, the wetting agents and the like can be preferably used in the present invention to adjust an extent of penetration of the coating liquid.

In the present invention, there is no particular restriction on the coating method used when the coated layer is disposed on the base material. For example, there are exemplified coating methods using conventionally known coaters such as an air doctor coater, a blade coater, a knife coater, a rod coater, a squeeze coater, an impregnation coater, a gravure coater, a kiss roll coater, a die coater, a reverse roll coater, a transfer roll coater, a spray coater and the like.

In the present invention, a coating amount of the coated layer that contains inorganic particles is preferably 1.0 to 20.0 g/m² as a dry solid content, and more preferably 4.0 to 15.0 g/m². When the coating amount of the coated layer is less than 1.0 g/m², the coated layer cannot sufficiently cover the surface of the base paper, a pore diameter of the separator becomes larger, and excellent battery characteristics may not be developed due to generation of the short-circuiting and so on. On the other hand, when the coating amount of the coated layer exceeds 20.0 g/m², it may become difficult to make the separator thin.

EXAMPLES

The present invention will be described in more detail with reference to Examples. Hereinafter, unless clearly stated otherwise, a part and a ratio described in Examples are based on mass.

(Preparation of Base Paper)

Firstly, base papers 1 to 10 were prepared in fiber compositions and basis weights described in Table 1 according to a method described below. The freeness of an aramid fiber used was a value measured according to a method described in JIS P8121-2:2012.

Various fibers described in Table 1 were together mixed, defibrated in water in a pulper, and, under stirring by an agitator, a uniform paper making slurry (concentration: 0.1%) was prepared. The base paper was made with a cylinder paper machine by using the paper making slurry, and then a PET fiber as a binder was adhered by a cylinder dryer at 120° C. to develop the strength of the base paper. Thus, the base papers 1 to 10 having a width of 50 cm and a basis weight of 10.5 g/m² were prepared.

TABLE 1

| Polyethylene Terephthalate Fiber | | Base Paper 1 | Base Paper 2 | Base Paper 3 | Base Paper 4 | Base Paper 5 | Base Paper 6 | Base Paper 7 | Base Paper 8 | Base Paper 9 | Base Paper 10 |
|---|---|---|---|---|---|---|---|---|---|---|---|
| Fineness dtex | Fiber Length mm | | | | | | | | | | |
| 0.06 | 3 | | | | | 40 | 60 | 70 | 30 | 20 | |
| 0.10 | 3 | | | | | 20 | | | 10 | 10 | |
| 0.30 | 3 | 10 | 10 | 30 | 60 | | | | | | |
| 0.60 | 3 | 50 | 50 | 30 | | | | | | | 60 |
| 0.20 (Un-drawn Fiber) | 3 | | 40 | 40 | 40 | 40 | 40 | 30 | 40 | 40 | |
| 1.20 (Un-drawn Fiber) | 5 | 40 | | | | | | | | | 40 |
| Aramid Fiber (Freeness 300 ml) | | | | | | | | | 20 | 30 | |
| Average Fiber Diameter μm | | 9.0 | 8.0 | 7.6 | 6.8 | 4.2 | 3.9 | 3.5 | 4.4 | 4.7 | 9.1 |

(Preparation of Base Material)

The base papers 1 to 10 were subjected to a heat calendering treatment under conditions described in Tables 2 to 4 with a heat calender machine to prepare base materials of Examples 1 to 21 and Comparative Examples 1 to 6. The column "Type" in Tables 2 to 4 shows a type of the heat calender machine. Further, in case of the two-stage treatments, the column "Linear Pressure" is expressed as "linear pressure at the first nip/linear pressure at the second nip".

[H] The heat calendering treatment was performed with a heat calender machine constituted of a heated metal roll and a heated metal roll.

[S] The heat calendering treatment was performed with a heat calender machine constituted of a heated metal roll and a resin roll. As the resin roll was used a roll obtained by winding a synthetic resin having the Shore hardness D92.

[HH] The two-stage (two-nip) heat calendering treatment was performed with a heat calender machine constituted of a heated metal roll and a heated metal roll such that the heated metal rolls come into contact with both of the front and back surfaces of the base paper.

[SS] The two-stage (two-nip) heat calendering treatment was performed with a heat calender machine constituted of a heated metal roll and a resin roll such that the heated metal roll comes into contact with both of the front and back surfaces of the base paper. As the resin roll was used a roll obtained by winding a synthetic resin having the Shore hardness D92.

[SH] The heat calendering treatment was performed with a heat calender machine constituted of a heated metal roll and a resin roll such that the heated metal roll comes into contact with a surface of the base paper, and thereafter the heat calendering treatment was performed with a heat calender machine constituted of a heated metal roll and a heated metal roll. As the resin roll was used a roll obtained by winding a synthetic resin having the Shore hardness D92.

TABLE 2

| | Type | Base Paper | Average Fiber Diameter μm | Temperature °C. | Liner Pressure kN/m | Processing Speed m/min |
|---|---|---|---|---|---|---|
| Example 1 | H | Base Paper 1 | 9.0 | 170 | 150 | 10 |
| Example 2 | H | Base Paper 2 | 8.0 | 170 | 150 | 10 |
| Example 3 | H | Base Paper 3 | 7.6 | 170 | 150 | 10 |
| Example 4 | H | Base Paper 4 | 6.8 | 170 | 150 | 10 |
| Example 5 | H | Base Paper 5 | 4.2 | 170 | 150 | 10 |
| Example 6 | H | Base Paper 6 | 3.9 | 170 | 150 | 10 |
| Example 7 | H | Base Paper 7 | 3.5 | 170 | 150 | 10 |
| Comparative Example 1 | H | Base Paper 10 | 9.1 | 170 | 150 | 10 |
| Comparative Example 2 | H | Base Paper 6 | 4.2 | 170 | 200 | 10 |
| Comparative Example 3 | H | Base Paper 6 | 3.6 | 170 | 150 | 40 |
| Comparative Example 4 | H | Base Paper 6 | 3.5 | 170 | 100 | 10 |
| Example 6 | H | Base Paper 6 | 3.9 | 170 | 150 | 10 |
| Example 8 | H | Base Paper 6 | 4.0 | 180 | 150 | 10 |
| Example 9 | H | Base Paper 6 | 4.1 | 195 | 150 | 10 |
| Example 10 | H | Base Paper 6 | 4.2 | 200 | 150 | 10 |
| Comparative Example 5 | H | Base Paper 6 | 4.1 | 210 | 150 | 10 |
| Example 9 | H | Base Paper 6 | 4.1 | 195 | 150 | 10 |
| Example 11 | H | Base Paper 8 | 4.4 | 195 | 150 | 10 |
| Comparative Example 6 | H | Base Paper 9 | 4.7 | 195 | 150 | 10 |

TABLE 3

| | Type | Base Paper | Average Fiber Diameter μm | Temperature °C. | Liner Pressure kN/m | Processing Speed m/min |
|---|---|---|---|---|---|---|
| Comparative Example 4 | H | Base Paper 6 | 3.5 | 170 | 100 | 10 |
| Example 6 | H | Base Paper 6 | 3.9 | 170 | 150 | 10 |
| Comparative Example 2 | H | Base Paper 6 | 4.2 | 170 | 200 | 10 |

TABLE 3-continued

| | Type | Base Paper | Average Fiber Diameter μm | Temperature ° C. | Liner Pressure kN/m | Processing Speed m/min |
|---|---|---|---|---|---|---|
| Example 12 | S | Base Paper 6 | 3.6 | 170 | 100 | 10 |
| Example 13 | S | Base Paper 6 | 4.1 | 170 | 150 | 10 |
| Example 14 | S | Base Paper 6 | 4.4 | 170 | 200 | 10 |
| Example 6 | H | Base Paper 6 | 3.9 | 170 | 150 | 10 |
| Example 8 | H | Base Paper 6 | 4.0 | 180 | 150 | 10 |
| Example 9 | H | Base Paper 6 | 4.1 | 195 | 150 | 10 |
| Example 10 | H | Base Paper 6 | 4.2 | 200 | 150 | 10 |
| Example 15 | S | Base Paper 6 | 4.0 | 170 | 150 | 10 |
| Example 16 | S | Base Paper 6 | 4.1 | 180 | 150 | 10 |
| Example 17 | S | Base Paper 6 | 4.3 | 195 | 150 | 10 |
| Example 18 | S | Base Paper 6 | 4.5 | 200 | 150 | 10 |

TABLE 4

| | Type | Base Paper | Average Fiber Diameter μm | Temperature ° C. | Liner Pressure kN/m | Processing Speed m/min |
|---|---|---|---|---|---|---|
| Example 6 | H | Base Paper 6 | 3.9 | 170 | 150 | 10 |
| Example 19 | HH | Base Paper 6 | 4.1 | 170 | 95/55 | 40 |
| Example 13 | S | Base Paper 6 | 4.1 | 170 | 150 | 10 |
| Example 20 | SS | Base Paper 6 | 4.2 | 170 | 95/55 | 40 |
| Example 21 | SH | Base Paper 6 | 4.3 | 170 | 95/55 | 40 |

Of the base papers obtained in Examples and Comparative Examples, the following measurements and evaluations were performed. Results are summarized in Tables 5 to 7.

<Density>

With respect to the base material, a basis weight was measured according to JIS P8124, and a thickness was measured according to JIS P8118. Thereafter, the density of the base material of the present invention was calculated by dividing the basis weight with the thickness.

<Specific X-Ray Diffraction Intensity>

An X-ray diffraction intensity of the base material of the present invention was measured by using an X-ray diffractometer "X' PertPro" produced by PANalytical Company under the following conditions.

1) Measurement of X-Ray Diffraction Intensity

Tube voltage: 45 kV

Tube current: 40 mV

Measurement area: A measurement area in one measurement was 15 mm×20 mm

Measurement points: For one base material, 7 or more measurement points (2100 mm$^2$ or more as total measurement area) were sampled such that the measurement points abut with each other, and measurement was performed. When the numbers of contact with the heated metal roll are different between surfaces of the base material, measurement was performed from a surface in which the number of contact is larger.

2) Data Processing of X-Ray Diffraction Intensity Data

Raw data of the X-ray diffraction intensity measured under the conditions described above was data-processed under the following conditions by using a dedicated software for analysis "X' Pert Highscore".

Removal of Background

Noises and background contained in the raw data of the X-ray diffraction intensity were removed and corrected by using an automatic mode.

Detection of Peaks

Among diffraction peaks derived from a crystalline part of the PET fiber, an intensity of the peak having a most strong peak intensity in the neighborhood of a diffraction angle 2θ=26° (in a range of diffraction angle of 25.5 to 26.5°) was taken as an X-ray diffraction intensity (unit: cps).

Calculation of Specific X-Ray Diffraction Intensity

In each of the measurement points of the base material sample, X-ray diffraction intensities in the neighborhood of a diffraction angle 26° were measured. A value obtained by dividing an average value of measured X-ray diffraction intensities by the basis weight of the base material was defined as a "specific X-ray diffraction intensity" (unit: cps/(g/m$^2$)).

Calculation of Coefficient of Variation

A value obtained by dividing a standard deviation of X-ray diffraction intensities by the average value of measured X-ray diffraction intensities in the neighborhood of a diffraction angle 26° measured in each of the measurement points of the base material sample was defined as a "coefficient of variation (COV)".

<Tensile Strength Ratio>

Referring to JIS P 8113, a tensile test of the base material sample was performed under the condition of a test width of 50 mm, a span between chucks of 100 mm and tensile speed of 300 mm/min. The measurement of the tensile strength was performed in both of a flow direction (MD) and a widthwise direction (CD) of the base material. In the present invention, a tensile strength ratio (unit: N·m/g) was obtained by dividing a sum of the tensile strength obtained in the flow direction (MD) and the tensile strength obtained in the widthwise direction (CD), by the basis weight of the base paper. The tensile strength ratio of 95 N·m/g or more is considered to be practically usable.

<Evaluation of Defect Frequency>

The base material was visually inspected over a paper width of 400 mm and a paper length of 500 m and defect frequency was evaluated according to the following evaluation criteria.

⊚: There is no crack defect generated in a length of 500 m.
○: There is one or two crack defects generated in a length of 500 m.
Δ: There are three to six crack defects generated in a length of 500 m.
X: There are seven or more crack defects generated in a length of 500 m.

<Winding Appearance of Roll>

A paper having a paper width of 400 mm and a paper length of 1000 m was wound and the winding appearance of the roll was visually inspected and evaluated according to the following evaluation criteria.

⊚: The winding appearance of the roll is excellent when the paper having a length of 1000 m was wound.
○: In the winding appearance of the roll when the paper having a length of 1000 m was wound, irregularity is hardly found.
Δ: In the winding appearance of the roll when the paper having a length of 1000 m was wound, irregularities are found but there is no practical problem.
X: In the winding appearance of the roll when the paper having a length of 1000 m was wound, irregularities are clearly found and wrinkles are found at edges.

<Production of Lithium Ion Secondary Battery Separator>

One hundred parts by mass of boehmite having a volume average particle size of 2.3 μm and a specific surface area of 3 m²/g were mixed and stirred thoroughly with 120 parts by mass of a 0.3% aqueous solution of carboxymethylcellulose sodium salt of which 1% by mass aqueous solution has viscosity of 200 mPa·s at 25° C. Subsequently, 300 parts by mass of a 0.5% aqueous solution of carboxymethylcellulose sodium salt of which 1% by mass aqueous solution has viscosity of 7000 mPa·s at 25° C., and 10 parts by mass of an emulsion (solid content concentration: 50%) of a carboxy-modified styrene butadiene resin (SBR) having a glass transition temperature of 5° C. and a volume average particle size of 0.2 μm were mixed and stirred to prepare a coating liquid. The coating liquid was coated, by means of a gravure coater, on one surface of the base material (on a surface of the base paper of which the number of contact is larger when the numbers of contact of the heated metal roll to the base paper are different) such that a coated amount as a dry solid content is 15.0 g/m², and thereafter dried to produce lithium ion secondary battery separators of Examples 1 to 21 and Comparative Examples 1 to 6.

In Examples and Comparative Examples, the following evaluations were performed during the production of the lithium ion secondary battery separators and with respect to the separators produced. Results are shown in Tables 5 to 7.

<Coatability>

In Examples and Comparative Examples, in order to check workability during the production of the separator, working efficiency during coating the coating liquid was evaluated as the coatability according to the following criteria, whereby workability during the production of the separator was evaluated. Practically, when the rating is [3] or better, the coating liquid was determined to be usable.

[5]: The coating liquid does not penetrate through the nonwoven fabric and a backing roll of the coater is not soiled.
[4]: The coating liquid does not penetrate through the nonwoven fabric but it is necessary to clean a backing roll of the coater sometimes.
[3]: The coating liquid penetrates through the nonwoven fabric sometimes. However, while cleaning a backing roll of the coater, operation can be continued.
[2]: The coating liquid penetrates through at a part of the nonwoven fabric and a backing roll of the coater is partially rendered white. Occasionally, it is necessary to stop the machine to clean the roll.
[1]: The coating liquid penetrates through the nonwoven fabric, a backing roll of the coater was rendered white, and operability is rather bad. It is necessary to frequently stop the machine and clean the roll.

<Strength of Coated Layer>

The separators of Examples and Comparative Examples were folded with a fold line such that the coated layer is located inside, and thereafter they were unfolded to an initial state and expanded. A state of cracks in the folded portion of the coated layer was visually evaluated based on the following criteria. Practically, when the rating is [3] or better, the coated layer was determined to be usable.

[5]: No damage is found in the folded portion of the coated layer.
[4]: Some small cracks are found in the folded portion.
[3]: Some cracks are found in the folded portion.
[2]: Many cracks are found in the folded portion.
[1]: With the folded portion at a center, the coated layer is peeled off from a surface of the nonwoven fabric.

<Handling>

Regarding the handling of separators of Examples and Comparative Examples, a base material having an A4 size was stood still on a horizontal table, and a degree of curling at each of four corners of the separator was visually evaluated according to the following criteria. Practically, when the rating is [2] or better, the separator was determined to be usable.

[4]: There is no curl in the separator.
[3]: There is a slight curl in the separator, but there is no need of curl correction.
[2]: There is a curl in the separator, but the separator can be used when a curl correction is performed.
[1]: The separator curls up and the curl correction is difficult.

TABLE 5

| | Density g/cm³ | Specific diffraction intensity cps/(g/m²) | COV (coefficient of variation) % | Tensible strength ratio N·m/g | Defect frequency | Winding appearance | Coatability | Strength of coated layer | Handling |
|---|---|---|---|---|---|---|---|---|---|
| Example 1 | 0.47 | 315 | 10.0 | 96 | Δ | Δ | 3 | 3 | 2 |
| Example 2 | 0.51 | 355 | 7.0 | 103 | Δ | Δ | 4 | 3 | 3 |
| Example 3 | 0.53 | 380 | 6.5 | 107 | Δ | Δ | 4 | 3 | 3 |
| Example 4 | 0.55 | 400 | 6.0 | 111 | Δ | Δ | 4 | 4 | 3 |
| Example 5 | 0.54 | 390 | 6.0 | 109 | Δ | Δ | 4 | 4 | 3 |
| Example 6 | 0.52 | 375 | 8.0 | 106 | Δ | Δ | 3 | 3 | 2 |
| Example 7 | 0.50 | 350 | 10.5 | 102 | Δ | Δ | 3 | 3 | 2 |
| Comparative Example 1 | 0.45 | 295 | 12.5 | 92 | Δ | X | 1 | 1 | 1 |

TABLE 5-continued

|  | Density g/cm³ | Specific diffraction intensity cps/(g/m²) | COV (coefficient of variation) % | Tensible strength ratio N · m/g | Defect frequency | Winding appearance | Coatability | Strength of coated layer | Handling |
|---|---|---|---|---|---|---|---|---|---|
| Comparative Example 2 | 0.51 | 363 | 18.1 | 104 | X | X | 3 | 2 | 2 |
| Comparative Example 3 | 0.45 | 297 | 15.1 | 92 | Δ | X | 2 | 2 | 1 |
| Comparative Example 4 | 0.45 | 292 | 12.2 | 91 | Δ | X | 1 | 2 | 1 |
| Example 6 | 0.52 | 375 | 8.0 | 106 | Δ | Δ | 3 | 3 | 2 |
| Example 8 | 0.54 | 395 | 4.5 | 110 | Δ | Δ | 4 | 3 | 3 |
| Example 9 | 0.56 | 417 | 4.0 | 114 | Δ | Δ | 4 | 3 | 3 |
| Example 10 | 0.57 | 425 | 5.9 | 115 | Δ | Δ | 3 | 3 | 3 |
| Comparative Example 5 | 0.55 | 400 | 13.0 | 111 | X | X | 2 | 2 | 3 |
| Example 9 | 0.56 | 417 | 4.0 | 114 | Δ | Δ | 4 | 3 | 3 |
| Example 11 | 0.50 | 350 | 6.0 | 102 | Δ | Δ | 4 | 3 | 2 |
| Comparative Example 6 | 0.45 | 295 | 12.1 | 92 | Δ | X | 3 | 3 | 1 |

TABLE 6

|  | Density g/cm³ | Specific diffraction intensity cps/(g/m²) | COV (coefficient of variation) % | Tensible strength ratio N · m/g | Defect frequency | Winding appearance | Coatability | Strength of coated layer | Handling |
|---|---|---|---|---|---|---|---|---|---|
| Comparative Example 4 | 0.45 | 292 | 12.2 | 91 | Δ | X | 1 | 2 | 1 |
| Example 6 | 0.52 | 375 | 8.0 | 106 | Δ | Δ | 3 | 3 | 2 |
| Comparative Example 2 | 0.51 | 363 | 18.1 | 104 | X | X | 3 | 2 | 2 |
| Example 12 | 0.47 | 320 | 7.0 | 97 | ○ | Δ | 3 | 3 | 2 |
| Example 13 | 0.55 | 400 | 5.5 | 111 | ○ | Δ | 4 | 4 | 3 |
| Example 14 | 0.52 | 370 | 9.0 | 108 | ○ | Δ | 3 | 3 | 3 |
| Example 6 | 0.52 | 375 | 8.0 | 106 | Δ | Δ | 3 | 3 | 2 |
| Example 8 | 0.54 | 395 | 4.5 | 110 | Δ | Δ | 4 | 3 | 3 |
| Example 9 | 0.56 | 417 | 4.0 | 114 | Δ | Δ | 4 | 3 | 3 |
| Example 10 | 0.57 | 425 | 5.9 | 115 | Δ | Δ | 3 | 3 | 3 |
| Example 15 | 0.54 | 390 | 4.8 | 109 | ○ | Δ | 4 | 4 | 3 |
| Example 16 | 0.56 | 411 | 4.5 | 113 | ○ | Δ | 4 | 4 | 3 |
| Example 17 | 0.57 | 426 | 4.0 | 116 | ○ | Δ | 4 | 4 | 4 |
| Example 18 | 0.57 | 427 | 5.9 | 116 | ○ | Δ | 3 | 3 | 4 |

TABLE 7

|  | Density g/cm³ | Specific diffraction intensity cps/(g/m²) | COV (coefficient of variation) % | Tensible strength ratio N · m/g | Defect frequency | Winding appearance | Coatability | Strength of coated layer | Handling |
|---|---|---|---|---|---|---|---|---|---|
| Example 6 | 0.52 | 375 | 8.0 | 106 | Δ | Δ | 3 | 3 | 2 |
| Example 19 | 0.55 | 403 | 3.5 | 111 | ○ | ○ | 4 | 4 | 3 |
| Example 13 | 0.55 | 400 | 5.5 | 111 | ○ | Δ | 4 | 4 | 3 |
| Example 20 | 0.55 | 410 | 2.4 | 113 | ◉ | ○ | 5 | 5 | 4 |
| Example 21 | 0.58 | 436 | 1.7 | 117 | ◉ | ◉ | 5 | 5 | 4 |

By comparing Examples 1 to 7 and Comparative Example 1, the followings were observed.

When an average fiber diameter of an entire base material exceeds 9.0 μm, the density of fibers crossing points is not sufficient, the strength of the base material decreases, and fluctuation becomes larger in a degree of the crystallization of the PET fiber. Further, the coating liquid penetrates too rapidly into the base material when a coated layer that contains inorganic particles is disposed, and as the results, the coating liquid penetrates through the base material, and the uniformity of the lithium ion secondary battery separator is impaired. Further, since workability during coating is low, whereby the working efficiency of the coating step is decreased.

When Example 6 and Comparative Example 2 are compared, the following were observed.

When the COV (coefficient of variation) exceeds 12.0%, the crack defects are generated in the base material and the winding appearance of the roll becomes poor. The reason why the coefficient of variation exceeded 12.0% in Comparative Example 2 is because the base paper was treated under rather strong linear pressure during calendering. The crystallization of the PET fiber proceeded, and the coefficient of variation exceeded 12.0% while the specific diffraction intensity was 300 cps/(g/m²)) or more.

When Example 6 and Comparative Examples 3 and 4 are compared, the followings were observed.

When the specific diffraction intensity is less than 300 cps/(g/m²)) and the COV (coefficient of variation) exceeds 12.0%, the strength of the base material is low, the penetration of the coating liquid tends to proceed, workability during coating is poor, and the strength of the coated layer in the lithium ion secondary battery separator decreases. In Comparative Examples 3 and 4, the reason why the specific diffraction intensity was less than 300 cps/(g/m$^2$)) and the COV (coefficient of variation) exceeded 12.0% is because the heat calendering treatment of the base material was not sufficient. Heat was un-uniformly imparted from the calender roll to the base paper, the crystallization of the PET fiber became insufficient, and the uniformity of the degree of crystallization was impaired.

From Examples 6, 8, 9 and 10, it was observed that by adjusting a temperature of the calender roll during heat calendering treatment, the crystallization of the PET fiber proceeds, the specific diffraction intensity becomes larger, and as the result, the strength of the base material is increased and workability during coating is improved.

By comparing Examples 6, 8, 9 and 10 and Comparative Example 5, the followings were observed.

When the COV (coefficient of variation) exceeds 12.0%, cracks are generated in the base material and the winding appearance is degraded. Further, since non-uniform binding between PET fibers is generated in the base material, local penetration of the coating liquid into the base material proceeds, and workability during coating is degraded. In Comparative Example 5, since heat is excessively imparted to the base material from the calender roll, the uniformity of degree of crystallization was impaired, and the COV (coefficient of variation) exceeded 12.0%.

By comparing Examples 9 and 11 and Comparative Example 6, the followings were observed.

Even when the base paper in which the PET fiber and other fiber than the PET fiber are blended is used, the base material that is excellent in strength is obtained when the PET fiber has an average fiber diameter of 9.0 µm or less, the specific X-ray diffraction intensity derived from the PET fiber is 300 cps/(g/m$^2$) or more, and the COV (coefficient of variation) is 12.0% or less. In Comparative Example 6 in which the COV (coefficient of variation) exceeded 12.0%, the strength of the base material is difficult to be developed. In Comparative Example 6, it is considered that since the content of the PET fiber was reduced excessively, a binding force between the PET fibers decreased, and the strength of the base material became difficult to be developed.

By comparing Example 6, Comparative Examples 2 and 4 and Examples 12 to 14, the followings were observed.

The base material that is excellent in strength and less in defects such as cracks or the like can be provided by performing the heat calendering treatment with a calender machine that is constituted of a resin roll and a heated metal roll rather than by performing the heat calendering treatment with a heat calender machine that is constituted of a heated metal roll and a heated metal roll. Further, there can efficiently be produced the base material that has the specific X-ray diffraction intensity derived from the PET fiber of 300 cps/(g/m$^2$)) or more and the COV (coefficient of variation) of 12.0% or less.

Also by comparing Examples 6, 8 to 10 and Examples 15 to 18, the followings were observed.

The base material that is excellent in strength and less in defects such as cracks or the like can be provided by performing the heat calendering treatment with a calender machine that is constituted of a resin roll and a heated metal roll rather than by performing the heat calendering treatment with a calender machine that is constituted of a heated metal roll and a heated metal roll. Further, there are many cases in which the strength of the coated layer of the lithium ion secondary battery separator is excellent, and this is considered because the coating liquid can moderately be suppressed from penetrating to the base material during disposing the coated layer.

By comparing Examples 6, 13 and Examples 19 to 21, the followings were observed.

When the heat calendering treatment is performed in two stages (two nips) or more such that the heated metal roll comes into contact with both of the front and back surfaces of the base material, there can efficiently be provided the base material that is excellent in strength and free from defects. Particularly, in Example 21, when the heat calendering treatment is performed with a calender machine that is constituted of a resin roll and a heated metal roll and a calender machine that is constituted of a heated metal roll and a heated metal roll, there can efficiently be provided the base material that is excellent in strength, less in defects and excellent in winding appearance as well as the lithium ion secondary battery separator that is excellent in the strength of the coated layer and in the handling.

INDUSTRIAL APPLICABILITY

The base material of the present invention for a lithium ion secondary battery separator and the lithium ion secondary battery separator of the present invention can preferably be used in a lithium ion secondary battery such as a lithium ion secondary battery, a lithium ion polymer secondary battery or the like.

The invention claimed is:

1. A base material for a lithium ion secondary battery separator comprising a polyethylene terephthalate fiber, characterized in that an average fiber diameter of the polyethylene terephthalate fiber is 9.0 µm or less, a specific X-ray diffraction intensity derived from the polyethylene terephthalate fiber is 300 cps/(g/m$^2$) or more, and a coefficient of variation of the specific X-ray diffraction intensity is 12.0% or less.

2. The base material for a lithium ion secondary battery separator as recited in claim 1, wherein an average fiber diameter of the polyethylene terephthalate fiber is 4.0 to 8.0 µm.

3. A process for producing a base material for a lithium ion secondary battery separator as recited in claim 1, wherein a base paper comprising a polyethylene terephthalate fiber is subjected to a heat calendering treatment with a heat calender machine constituted of a resin roll and a heated metal roll.

4. The process for producing a base material for a lithium ion secondary battery separator as recited in claim 3, wherein the base paper is subjected to a heat calendering treatment of two stages (2 nips) or more in such a manner that the both front and back surfaces of the base paper come in contact with a heated metal roll.

5. A lithium ion secondary battery separator, characterized in that a coating layer containing inorganic particles has been applied onto the base material for a lithium ion secondary battery separator as recited in claim 1.

6. A lithium ion secondary battery separator, characterized in that a coating layer containing inorganic particles has been applied onto the base material for a lithium ion secondary battery separator as recited in claim 2.

* * * * *